(12) United States Patent
Reynolds

(10) Patent No.: US 8,097,364 B2
(45) Date of Patent: *Jan. 17, 2012

(54) ELECTROACTIVE MATERIAL FOR CHARGE TRANSPORT

(75) Inventor: Thomas A. Reynolds, Bend, OR (US)

(73) Assignee: Integrated Resource Recovery, Inc, San Mateo, CA (US)

( * ) Notice: Subject to any disclaimer, the term of this patent is extended or adjusted under 35 U.S.C. 154(b) by 903 days.

This patent is subject to a terminal disclaimer.

(21) Appl. No.: 12/058,771

(22) Filed: Mar. 31, 2008

(65) Prior Publication Data

US 2009/0246563 A1 Oct. 1, 2009

(51) Int. Cl.
*H01M 4/58* (2010.01)
*H01M 4/02* (2010.01)
*H01M 4/133* (2010.01)
*H01M 6/04* (2010.01)
*B32B 5/16* (2006.01)

(52) U.S. Cl. ............ 429/231.8; 429/229; 429/211; 429/188; 428/402

(58) Field of Classification Search .......... 429/515, 429/122, 188, 229, 231.8, 211; 445/51; 428/402; 361/502
See application file for complete search history.

(56) References Cited

U.S. PATENT DOCUMENTS
2007/0042667 A1* 2/2007 Sung .................. 445/51

OTHER PUBLICATIONS

Duclaux et al., "Clay/Carbon Nanocomposites as Precursors of Electrode Materials for Lithium-Ion Batteries and Supercapacitors", Molecular Crystals and Liquid Crystals, vol. 340, Abstract, 2000.*
Cooper et al., "The Zinc-Air Refuelable Battery:Alternative Zinc Fuel Morphologies and Cell Behavior", 12th Annual Battery Conference on Applications and Advances, Long Beach, CA Jan. 14-17, 1997.*

* cited by examiner

*Primary Examiner* — Jonathan Crepeau
*Assistant Examiner* — Kenneth Douyette
(74) *Attorney, Agent, or Firm* — David E. Lovejoy

(57) ABSTRACT

An electroactive material for charge transport. The material is formed of a plurality of nanocomponents including nanoparticles, in turn formed of conductive carbon-based clusters bound together by a conductive carbon-based cluster binder including nanoclusters and nanocluster binders, all having high densities of mobile charge carriers (electrons, electronic acceptors, ionic species). A terminal is electrically coupled to the nanoparticles for charge transport.

17 Claims, 11 Drawing Sheets

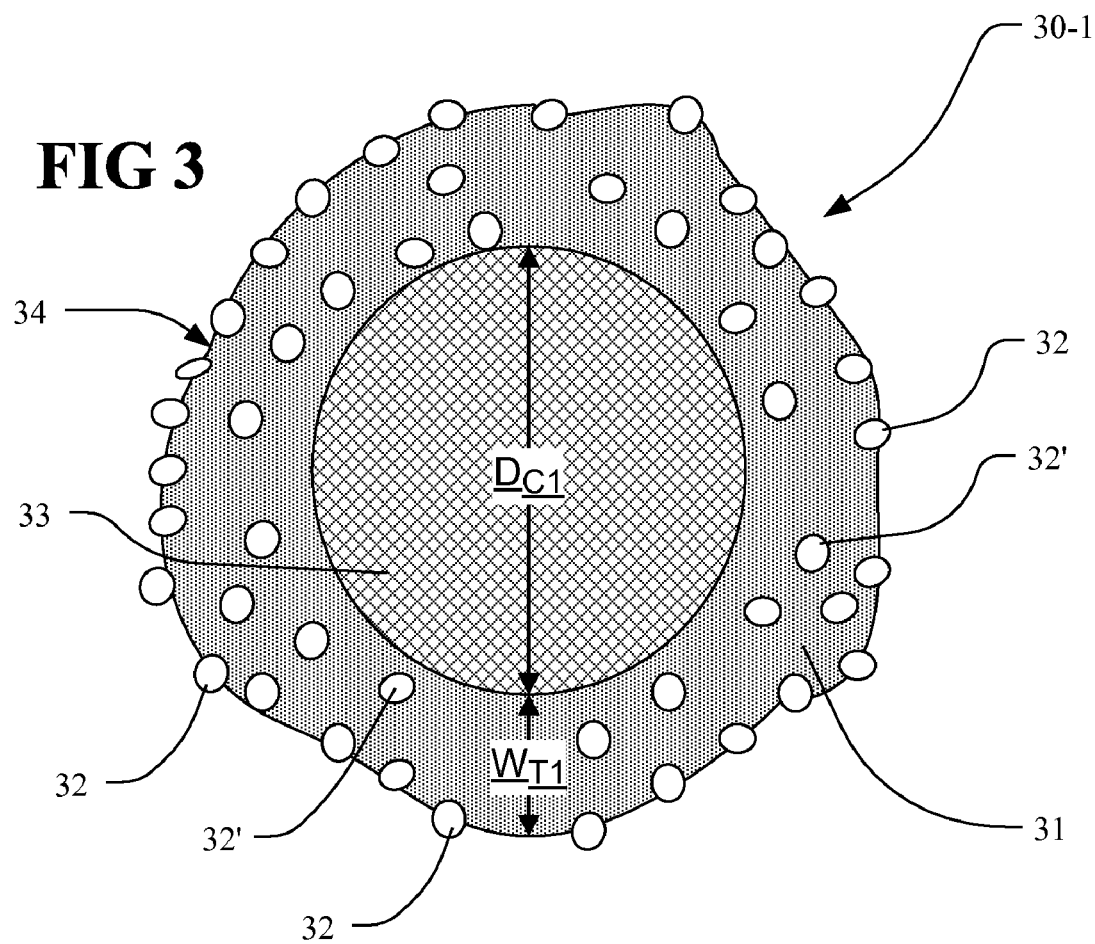
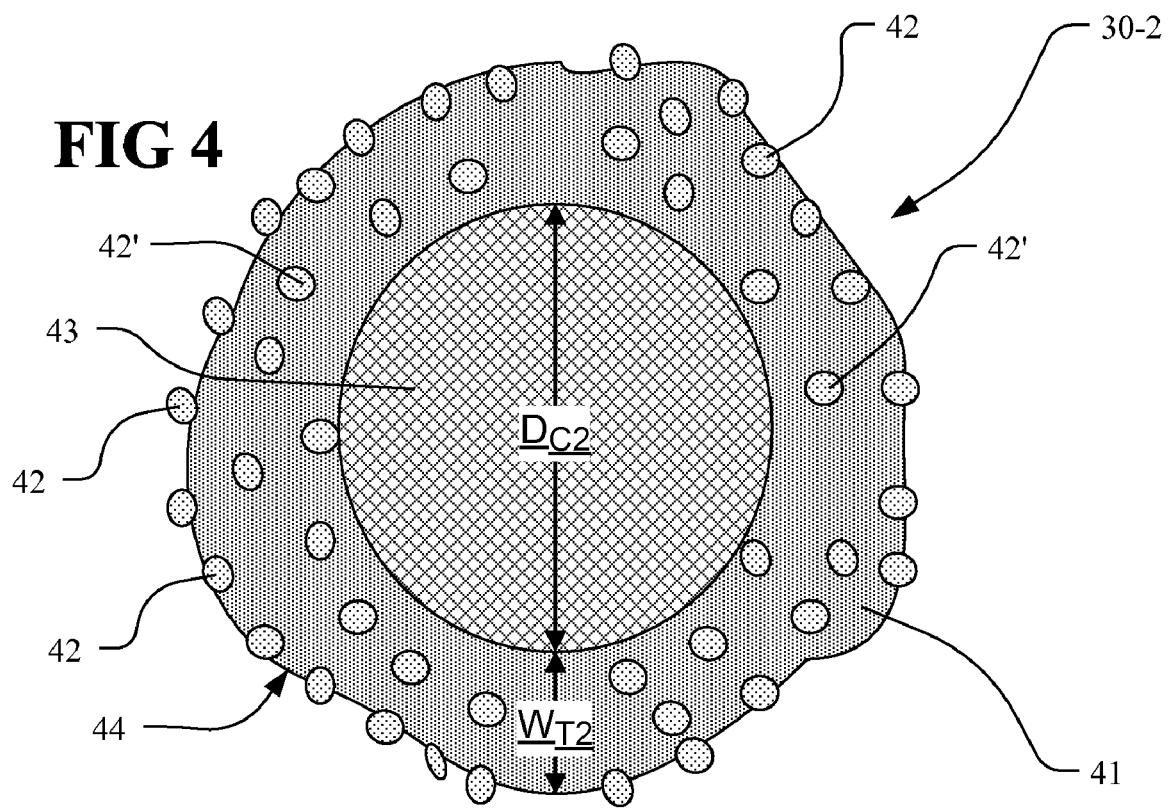

ELECTROACTIVE MATERIAL FOR CHARGE TRANSPORT

TECHNICAL FIELD

The present invention relates to electrodes and electrochemical devices having electrodes that undergo electrochemical reactions and particularly to nanomaterial electrodes and devices.

BACKGROUND OF THE INVENTION

Nanomaterials are materials that include components with nanometer dimensions, for example, where at least one dimension is less than 100 nanometers. Examples of such materials are allotropes of carbon such as nanotubes or other carbon fullerenes and components of carbon char. Carbon black was an early use of nanomaterials in tire manufacturing. Other nanomaterials include inorganic materials such as metal sulfides, metal oxides and organic materials. Because of the small dimensions, nanomaterials often exhibit unique electrical and electrochemical properties and unique energy transport properties. These properties are most pronounced when high surface areas are present and when charge transport mechanisms exist in the nanomaterials.

Some nanomaterials are manufactured using rigorous processing steps that are expensive and commercially unattractive. Some nanomaterials occur naturally or incidentally in commercial processing steps. Naturally or incidentally occurring nanomaterials tend to be highly irregular in size and composition because the environment in which they are produced is not adequately controlled for the production of nanomaterials. Processing methods that produce nanomaterials include among others, liquid-phase steps, gas-phase steps, grinding steps, size-reduction steps and pyrolysis steps.

Pyrolysis is the heating of materials in the absence of oxygen to break down complex matter into simpler molecules and components. When carbon based materials are pyrolyzed, the process of carbonization can occur leading to an ordered state of semi-graphitic material. When carbon based materials are pyrolyzed in uncontrolled conditions, a large amount of randomly ordered carbon material results. When both carbon and inorganic materials are present, pyrolysis under controlled conditions can lead to highly useful and unique results. An example of a use of pyrolysis is for the break down of used tires (typically from automobiles, trucks and other vehicles). The pyrolysis of tires results in, among other things, a carbon/inorganic residue called char.

The composition of char from tire pyrolysis is determined by the materials that are used to manufacture tires. The principal materials used to manufacture tires include rubber (natural and synthetic), carbon black (to give strength and abrasion resistance), sulfur (to cross-link the rubber molecules in a heating process known as vulcanization), accelerator metal oxides (to speed up vulcanization), activation inorganic oxides (principally zinc oxide, to assist the vulcanization), antioxidant oxides (to prevent sidewall cracking), a textile fabric (to reinforce the carcass of the tire) and steel belts for strength. The carbon black has a number of carbon structures including graphitic spheroids with nanometer dimensions, semi graphitic particles and other forms of ordered carbon structures.

In summary, the manufacture of tires initially mixes the materials to form a "green" tire where the carbons and oxides form a homogenous mixture. The "green" tire is transformed into a finished tire by the curing process (vulcanization) where heat and pressure are applied to the "green" tire for a prescribed "cure" time. The carbon materials used in "green" tires are typically as indicated in TABLE 1:

TABLE 1

| DESIGNATION | SIZE (nm) |
|---|---|
| N110 | 20-25 |
| N220 | 24-33 |
| N330 | 28-36 |
| N300 | 30-35 |
| N550 | 39-55 |
| N683 | 49-73 |

When tires are discarded, they are collected for pyrolysis processing to reclaim useful components of the tires. In general, tire pyrolysis involves the thermal degradation of the tires in the absence of oxygen. Tire pyrolysis has been used to convert tires into value-added products such as pyrolytic gas (pyro-gas), oils, char and steel. Pyrolysis is performed with low emissions and other steps that do not have an adverse impact on the environment. The basic pyrolysis process involves the heating of tires in the absence of oxygen. To enhance value, the oils and char typically under go additional processes to provide improved products.

The electron transfer can occur at an electrode through the release of chemical energy to create an internal voltage or through the application of an external voltage. Such electrochemical reactions where electrons are transferred between atoms or molecules are called oxidation/reduction or redox reactions. Oxidation and reduction reactions can be separated in space and time and devices with such reactions are often connected to external electric circuits. The creation of internal voltages at electrodes is useful in batteries and the application of external voltages to electrodes is useful in capacitors. In connection with electrochemical reactions at electrodes, the atom or molecule which loses electrons is oxidized, and the material which accepts the electrons is reduced.

In battery cells, electric current is generated from energy released by a spontaneous redox reaction. The battery cells have two electrodes (the anode and the cathode). The anode is the electrode where oxidation occurs and the cathode is the electrode where reduction occurs.

The electrodes of a battery cell are in an electrolyte where the cations are the oxidized form of the electrode metal. The tendency of the electrode metals to oxidize or reduce, in a particular electrolyte, is controlled by the electrochemical potential which depends on the temperature, pressure, the composition and concentration of the electrolyte and the nature and composition of the anode and the cathode. In a battery cell, when the anode undergoes oxidation and the cathode undergoes reduction, the sum (sign and magnitude) of the electrochemical potentials at both electrodes produces an electrical potential difference between the two electrodes.

Primary batteries are batteries that are not recharged and are discarded after discharge. Secondary batteries are batteries that are recharged, that is, they are recharged after a discharge and are reused multiple times. There are many known batteries including the following common examples. Each battery type has unique cost and performance advantages and disadvantages.

Lithium Ion batteries are found in consumer electronics including laptops, digital cameras and cell phones. Nickel-cadmium and Nickel-metal hydride batteries are used for rechargeable applications. Alkaline batteries are used for disposable applications. Lead acid batteries have deep cycles and are used in automobiles. One criteria in judging the quality of a battery is its power and energy to weight ratio. While bigger batteries are able to provide more energy, they often do not meet the size requirements in consumer electronics.

Zinc-air batteries (non-rechargeable) and zinc-air fuel cells, (mechanically-rechargeable) are electrochemical batteries powered by the oxidation of zinc with oxygen from the air. These batteries have high energy densities and are relatively inexpensive to produce. They are used in hearing aids and in experimental electric vehicles. Particles of zinc are mixed with an electrolyte (usually potassium hydroxide solution); water and oxygen from the air react at the cathode and form hydroxyls which migrate into the zinc paste and form zinc oxide hydroxide, $ZnO(OH)_4^{2-}$, at which point electrons are released and travel to the cathode. The zinc decays into zinc oxide and water is released back into the system. The water and hydroxyls from the anode are recycled at the cathode, so the water serves only as a catalyst. The reactions produce a maximum voltage level of 1.65 volts. The nickel-cadmium battery (NiCd) is a rechargeable battery using nickel oxide hydroxide and metallic cadmium as electrodes. Nickel cadmium batteries tolerate deep discharge for long periods in contrast, for example, to lithium ion batteries, which are highly volatile and are permanently damaged if discharged below a minimum voltage. The NiCd batteries have a higher number of charge/discharge cycles than other rechargeable batteries and have faster charge and discharge rates than lead-acid batteries.

Lead-acid batteries are less expensive alternative to NiCd batteries although NiCd batteries are smaller and lighter than comparable lead-acid batteries.

Alkaline batteries have a higher capacity than equivalent NiCd batteries. However, an alkaline battery's chemical reaction is typically not reversible so that a reusable NiCd battery has a significantly longer total lifetime. Since an alkaline battery's voltage drops as the charge drops, most consumer applications are well equipped to deal with the slightly lower NiCd voltage with no noticeable loss of performance.

Nickel metal hydride (NiMH) batteries have a higher capacity and are less toxic than NiCd batteries. NiCd batteries have a lower self-discharge rate (for example, 20% per month for a NiCd, versus 30% per month for a NiMH). This results in a preference for NiCd over NiMH in applications where the current draw on the battery is lower than the battery's own self-discharge rate (for example, television remote controls).

A zinc-carbon battery is typically packaged in a zinc can that serves as both a container and anode. The cathode is a mixture of manganese dioxide and carbon powder. The electrolyte is a paste of zinc chloride and ammonium chloride dissolved in water. Carbon-zinc batteries are low-cost primary batteries. The container of the zinc-carbon battery is a zinc can. The battery contains a layer of $NH_4Cl$ with $ZnCl_2$ aqueous paste separated by a paper layer from a mixture of powdered carbon and manganese oxide ($MnO_2$) which is packed around a carbon rod. The outer zinc container is the anode (−). The zinc is oxidized according to the following half-equation.

$$Zn(s) \rightarrow Zn^{2+}(aq) + 2e^-$$

A rod surrounded by a powder containing manganese oxide is the cathode(+). The manganese dioxide is mixed with carbon powder to increase the conductivity of the cathode mixture. The cathode reaction is as follows:

$$2MnO_2(s) + 2H^+(aq) + 2e^- \rightarrow Mn_2O_3(s) + H_2O(l)$$

The $H^+$ comes from the $NH_4^+$(aq):

$$NH_4^+(aq) \rightarrow H^+(aq) + NH_3(aq)$$

and the $NH_3$ combines with the $Zn^{2+}$. In this half-reaction, the manganese is reduced from an oxidation state of (+4) to (+3). The overall reaction in a zinc-carbon cell can be represented as:

$$Zn(s) + 2MnO_2(s) + 2NH_4^+(aq) \rightarrow Mn_2O_3(s) + Zn(NH_3)_2^{2+}(aq)$$

The zinc-carbon battery has an open cell voltage of about 1.5 V. The approximate nature of the voltage is related to the complexity of the cathode reaction. The anode (zinc) reaction is comparatively simple with a known potential. Side reactions and depletion of the active chemicals increases the internal resistance of the AAA battery and this causes the cell voltage to drop.

Advances are being made in battery technology research using nanomaterials. In one example, batteries are printed onto a surface with "nanotube ink" using the same zinc-carbon chemistry as ordinary non-rechargeable batteries. The nanomaterial batteries are less than a millimeter thick, are made from two layers containing carbon nanomaterials and have a third layer of zinc foil. The carbon nanomaterials are packed into these layers and form randomly oriented nanomaterial networks that conduct charge. Although use of nanomaterials is promising, the processing has not yet resulted in practical applications.

While batteries of many types are known such as the examples described above, there is a need for improved electrodes based on nanomaterials and for new batteries using the new nanomaterials.

SUMMARY

The present invention is an electroactive material for charge transport. The material is formed of a plurality of nanocomponents including nanoparticles, in turn formed of conductive carbon-based clusters bound together by a conductive carbon-based cluster binder including nanoclusters and nanocluster binders, all having high densities of mobile charge carriers (electrons, electronic acceptors, ionic species). A terminal is electrically coupled to the nanoparticles for charge transport.

The material and each of the nanocomponents play key roles in the process of charge transport including supplying electrons and electron acceptor sites. The charge transport occurs by the electron travel through the highly conductive and relatively short path of the binders with proximity to the nanoclusters. The small sizes of the particles provide large surface areas. In general, particle sizes of less than about 100 nanometers are preferred in order to have large surface areas which provide ready access of the electrolyte to the nanocomponents of the particles. The combination of the high density of available electrons in all the nanocomponents of the particles with the short distances among all the nanocomponents of the particles and the large surface areas of the nanocomponents greatly enhances the energy and power densities achieved.

Because of the short nanodistances of the particles, the density of clusters producing electrons tends to be high resulting in high energy densities greater than 150 watt-hours/kilogram. Because of the short nanodistances of the particles, the intercalation rate is fast resulting in high power densities, for example, greater than 4000 watts/kilogram. In a further embodiment, a second electroactive material is provided for charge transport. The second material is formed of a second plurality of nanocomponents including second nanoparticles, in turn formed of conductive carbon-based clusters bound together by a conductive carbon-based cluster binder including nanoclusters and nanocluster binders, all having high densities of mobile charge carriers (electrons, electronic acceptors, ionic species). A second terminal is electrically coupled to the nanoparticles for charge transport.

In a further embodiment, the second plurality of particles are substantially the same as the first plurality of particles including redox-active zinc sulfide nanoclusters.

In a further embodiment, the second plurality of particles are substantially different from the first plurality of particles including zinc-depleted sulfide nanoclusters.

In a further embodiment, the zinc-depleted sulfide nanoclusters are charge receptors and wherein charge transport uses electrolyte ions.

In a further embodiment, the second plurality of particles are separated from the first plurality of particles by an ion permeable membrane.

In a further embodiment, the carbon nanosphere cores have diameters of less than approximately 100 nanometers.

The electroactive material of claim 2 wherein the composite layer has a wall thickness of less than approximately 1200 nanometers.

In a further embodiment, a substantial number of the clusters have diameters of less than approximately 1200 nanometers.

The foregoing and other objects, features and advantages of the invention will be apparent from the following detailed description in conjunction with the drawings.

BRIEF DESCRIPTION OF THE DRAWINGS

FIG. 3 depicts a schematic representation of a typical composite having zinc sulfide nanoclusters.

FIG. 4 depicts a schematic representation of a typical composite having zinc-depleted nanoclusters.

DETAILED DESCRIPTION

Figure 1:
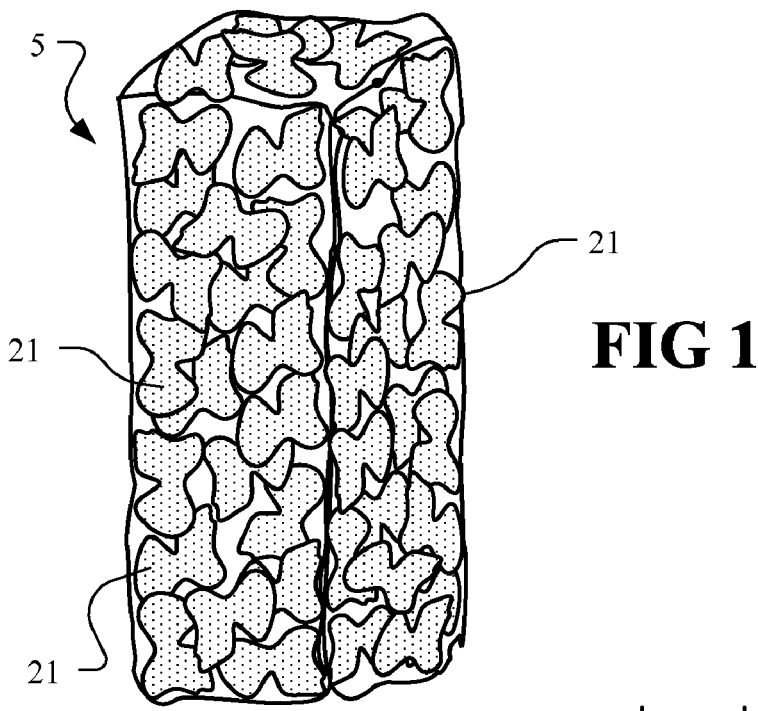
FIG. 1 is a schematic representation of material formed of particles including composites having nanoclusters.

The char obtained from the pyrolysis of tires is an inexpensive source of nanomaterials that, with further control and added processing, are potentially useful in many fields including Photo Catalysts, Contact Catalysts, Capacitors, Batteries, Sorbents (Adsorbents and Absorbents) and Photo Voltaic Materials. The ability to use nanomaterials derived from char in useful applications is dependent on controlling the parameters of the tire pyrolysis process and the processing of char for particular applications.

One particular application of processed char is for electrodes that are used in batteries, electrochemical capacitors and other devices. In general, electrodes undergo reactions that take place in a solution at the interface of an electron conductor (electrode) and an ionic conductor (electrolyte). Electrons transfer between the electrode and the electrolyte or species in solution. Typical electrolytes include aqueous, organic, inorganic and polymeric.

The electron transfer can occur at an electrode through the release of chemical energy to create an internal voltage or through the application of an external voltage. Electrochemical reactions transfer electrons between atoms or molecules. These reactions can be separated in space and time and devices with such reactions are often connected to external electric circuits. The creation of internal voltages at electrodes is useful in electrochemical capacitors.

One example of batch pyrolysis uses a furnace/retort, a three stage condensing system, a water scrubber, and a flare. An oil tank collects the condensed oil at the end of each test. The furnace uses two burners. The operating temperature of the furnace is set at 1,750° F. with a control range of plus/minus 30 to 40° F. When the control temperature is reached, one burner is shut off continuing with a small upward drift in temperature. When the temperature drifts down, the burner restarts automatically. Both burners are on for the first 90 minutes. Burner cycle time after the start of the run is a few seconds; near the end of the run, one burner is off for period as long as three minutes with a like interval of being on. Exhaust gas temperature remains relatively stable between 1,250 and 1380° F. Pyro gas generation starts after 105 minutes of operation at a temperature of 650° F., reached a high of 700° F., and dropped to 375° F. at the end of the thermal cycle. The thermal operation is monitored using the back pressure in the retort, the cooling water temperature, and visually watching the flare. A run lasts approximately 16 hours.

At the end of the run, the furnace back pressure is almost atmospheric, the cooling water delta temperature is almost zero, and the flare is out. During this operational period, the ambient air temperature ranged from about 20 to 45° F. The retort is opened approximately 8 hours after the thermal cycle is shut down. The estimated temperature of the char is less than 350° F. Prior to opening the retort, the retort is purged with nitrogen for a brief period of time. After the lid is opened, a very small quantity of vapor comes from the remaining char and tire wire. Cooling water flow (rate and temperature) is monitored as a check of the process gas generation rate and the condensing duty for both the condensable and non-condensable fraction of the process gas produced. When the inlet and outlet temperatures of the cooling water measures about the same, the operation is complete. The operating pressure of the retort ranges from two to eight millibars above atmospheric, which is sufficient to transport the gas through the condensing system to the flare. For the example described, the tire charge was 3,400 pounds in eight bales. The eight bales averaged 15 tires, with an average weight of 28 pounds per tire. The output yield of char was approximately 25% or more of the tire input.

After pyrolysis of tires, the composition of char, for one typical example, includes carbon as previously indicated in TABLE 1 and includes inorganic materials, such as metal sulfides and metal oxides, as indicated in the following TABLE 2:

TABLE 2

| MATERIAL | FORMULA | x RANGE |
| --- | --- | --- |
| Aluminum oxide (Al) | $Al_2O_{(3-x)}S_x$ | 0 to 3 |
| Barium oxide (Ba) | $BaO_{(1-x)}S_x$ | 0 to 3 |
| Bismuth oxide (Bi) | $Bi_2O_{(3-x)}S_x$ | 0 to 3 |
| Calcium oxide (Ca) | $CaO_{(1-x)}S_x$ | 0 to 1 |
| Chromium oxide (Cr) | $Cr_2O_{(3-x)}S_x$ | 0 to 3 |
| Iron oxide (Fe) | $Fe_2O_{(3-x)}S_x$ | 0 to 3 |
| Iron oxide (Fe) | $FeO_{(2-x)}S_x$ | 0 to 2 |
| Lead oxide (Pb) | $FeO_{(1-x)}S_x$ | 0 to 1 |
| Magnesium oxide (Mg) | $MgO_{(1-x)}S_x$ | 0 to 2 |
| Manganese oxide (Mn) | $Mn_2O_{(3-x)}S_x$ | 0 to 3 |
| Molybdenum oxide (Mo) | $Mo_2O_{(3-x)}S_x$ | 0 to 3 |
| Molybdenum oxide (Mo) | $MoO_{(2-x)}S_x$ | 0 to 2 |
| Phosphorous oxide (P) | $P_2O_{(5-x)}S_x$ | 0 to 5 |
| Potassium oxide (K) | $K_2O_{(1-x)}S_x$ | 0 to 1 |
| Silicon oxide (Si) | $SiO_{(2-x)}S_x$ | 0 to 2 |
| Sodium oxide (Na) | $Na_2O_{(1-x)}S_x$ | 0 to 2 |
| Stronium oxide (Sr) | $SrO_{(1-x)}S_x$ | 0 to 1 |
| Titanium oxide (Ti) | $Ti_2O_{(3-x)}S_x$ | 0 to 3 |
| Titanium oxide (Ti) | $TiO_{(2-x)}S_x$ | 0 to 2 |
| Zinc oxide (Zn) | $ZnO_{(1-x)}S_x$ | 0 to 1 |
| Other Metal oxides (trace) | | |
| Pyrolitic Carbon | $C_{6m}C_n$ | m > n(aromatic) |

The combination of TABLE 1 materials and TABLE 2 materials as produced by the pyrolysis process form nanomaterial composites useful in many fields including Photo Catalysts, Contact Catalysts, Capacitors, Batteries, Sorbents (Adsorbents and Absorbents) and Photo Voltaic Materials.

The TABLE 2 materials are "heavy metal free" in that even if trace amounts of heavy metals were produced as a result of tire pyrolysis, the trace amounts are so small that no environmental hazard is presented.

In FIG. 1, the material 5 includes nanomaterial in the form of particles 21 derived from char in the manner previously described. Typically, the char is processed for size reduction, sorting, classification and other attributes to form the char particles 21.

Figure 2:
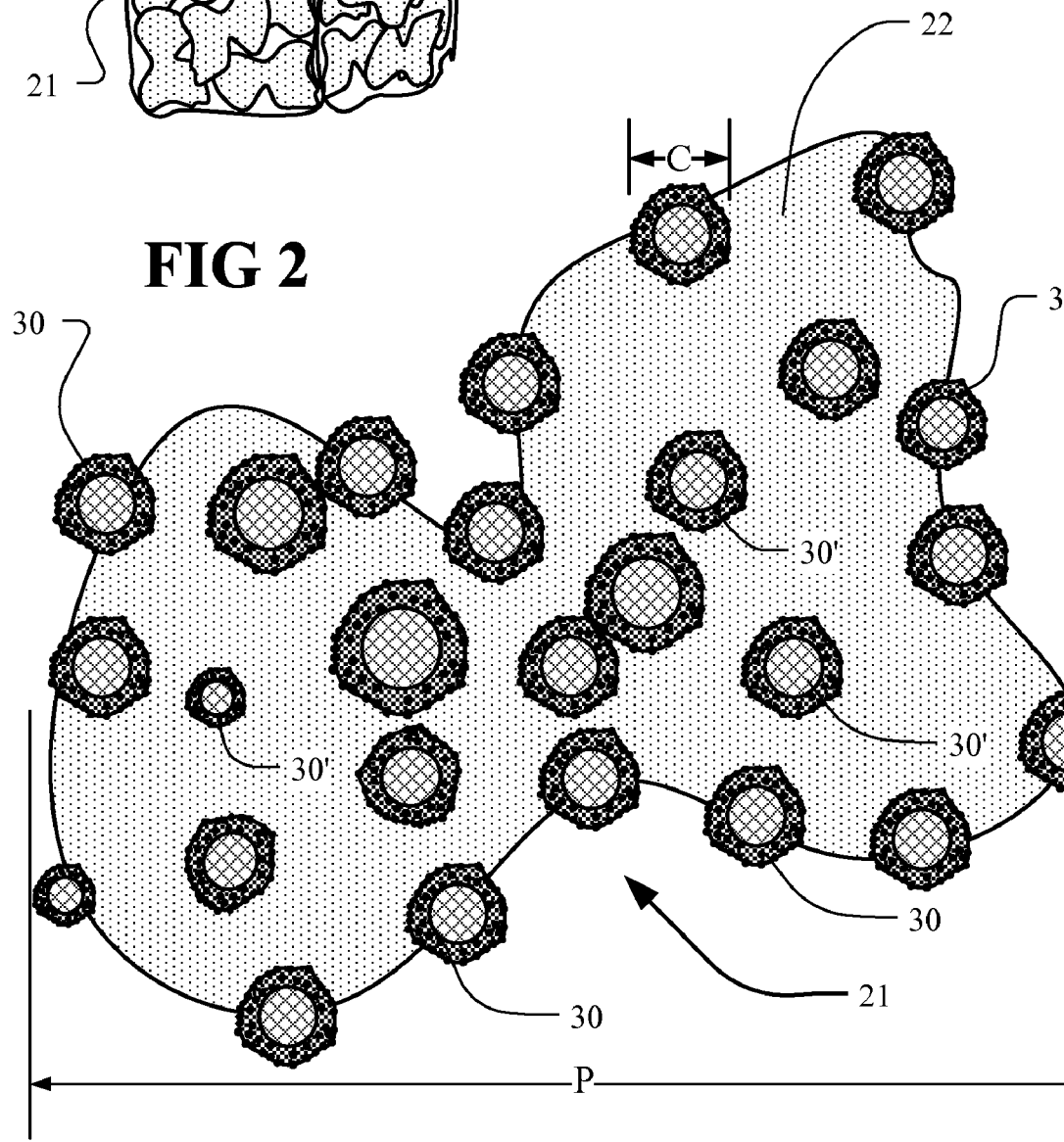
FIG. 2 depicts a schematic representation of a typical particle of the FIG. 1 material including composites having nanoclusters.

In FIG. 2, a schematic representation of a particle 21 is shown that is typical of the particles 21 in the material 5 of FIG. 1. In embodiments where the material 5 is used in an electrode, the particles 21 of FIG. 1 typically have at least one dimension, P, in a range from approximately 10 nm to approximately 10,000 nm. In FIG. 2, the particle 21 includes a plurality of clusters 30 that are held together by a cluster binder 22. The material of the cluster binder 22 primarily contains components of TABLE 1 and TABLE 2.

In the particle 21, a number of the clusters 30 are externally located around the periphery of the particle 21 and a number of the clusters 30, designated as clusters 30', are located internally away from the periphery of particle 21. The internally located clusters 30' are loosely encased by the cluster binder material 22. The selection of particle sizes in a range from approximately 50 nm to approximately 1000 nm tends to optimize the number of active and externally located clusters 30 and thereby enhances the electrochemical operations of the electrodes. The internally located clusters 30' are efficiently coupled electrically and through intercalation.

In FIG. 3, a schematic representation is shown of a cluster 30-1 that is typical of one embodiment of clusters 30 of FIG. 2. The cluster 30-1 has a carbon nanosphere core 33 encased by a composite layer 34. The carbon nanosphere core 33 is generally spherical in shape (a nanosphere) and has a core diameter, $D_{C1}$, in a range from approximately 10 nanometers to approximately 1000 nanometers. The composite layer 34 has a wall thickness, $W_{T1}$, in a range from approximately 0.2 nanometers to approximately 300 nanometers. The overall diameter of the cluster 30-1 ($D_{C1}+W_{T1}$) in a range from approximately 10 nanometers to approximately 1300 nanometers.

In FIG. 3, the size and shape of the carbon nanosphere cores 33 are limited primarily by the size and the shape of the cores used in the mixture forming the "green" tires as indicated in TABLE 1. The melting point of graphite is approximately in the range from 1900° C. to 2800° C. Since both the vulcanization and the pyrolysis processes operate at much lower temperatures, the carbon nanosphere cores 33 in finished tires and in tire char remain essentially undisturbed from their original size and shape.

In FIG. 3, the composite layers 34 surrounds and incases the carbon nanosphere cores 33. The sizes and the shapes of the composite layers 34 are determined in part by the sizes and the shapes of the carbon nanosphere cores 33 and additionally by the processing of the tire char. The processing of the char is done so as to achieve the 0.2 nanometers to approximately 1200 nanometers for the wall thickness, $W_{T1}$, and so as to achieve the overall diameter, ($D_{C1}+W_{T1}$), of the clusters 30-1 in a range from approximately 10 nanometers to approximately 1300 nanometers.

In FIG. 3, the composite layer 34 is carbon and contains a mixture of metal oxides and metal sulfides of TABLE 2 and other materials as described in TABLE 1, surrounding and bound to the carbon nanosphere core 33. Specifically, the composite layer 34 includes zinc sulfide nanoclusters 32 embedded in and forming part of the composite layer 34. A number of the nanoclusters 32 are externally located, that is, located around the periphery of the cluster 30-1 and a number of the nanoclusters 32, designated as nanoclusters 32', are located internally away from the periphery of the composite layer 34. The composition of the composite layer 34 typically has zinc sulfide (ZnS) in a range, for example, of 2% to 20% by weight, and carbon and other components of TABLE 2.

In FIG. 4, a schematic representation is shown of a cluster 30-2 that is typical of one embodiment of clusters 30 of FIG. 2. The cluster 30-2 has a graphitic carbon (core 43 encased by a composite layer 44. The core 43 is generally spherical in shape (a nanosphere) and has a core diameter, $D_{C2}$, in a range from approximately 10 nanometers to approximately 1000 nanometers. The composite layer 44 has a wall thickness, $W_{T2}$, in a range from approximately 0.2 nanometers to approximately 300 nanometers. The overall diameter of the cluster 30-2 ($D_{C2}+W_{T2}$) in a range from approximately 10 nanometers to approximately 1300 nanometers.

In FIG. 4, the size and shape of the cores 43 are limited primarily by the size and the shape of the cores used in the mixture forming the "green" tires as indicated in TABLE 1. The melting point of is approximately in the range from 1900° C. to 2800° C. Since both the vulcanization and the pyrolysis processes operate at much lower temperatures, the cores 43 in finished tires and in tire char remain essentially undisturbed from their original size and shape.

In FIG. 4, the composite layers 44 surrounds and incases the cores 43. The sizes and the shapes of the composite layers 44 are determined in part by the sizes and the shapes of the cores 43 and additionally by the processing of the tire char. The processing of the char is done so as to achieve the 0.25 nanometers to approximately 80 nanometers for the wall thickness, $W_{T2}$, and so as to achieve the overall diameter, ($D_{C2}+W_{T2}$), of the clusters 30-2 in a range from approximately 5 nanometers to approximately 100 nanometers.

In FIG. 4, the composite layer 44 is carbon and contains a mixture of metal oxides and metal sulfides surrounding and bound to the core 43. Specifically, the composite layer 44 includes zinc sulfide nanoclusters 42 embedded in and forming part of the composite layer 44. A number of the nanoclusters 42 are externally located, that is, located around the periphery of the cluster 30-2 and a number of the nanoclusters 42, designated as nanoclusters 42', are located internally away from the periphery of the composite layer 44. The composition of the composite layer 44 typically has zinc sulfide (ZnS) in a range from approximately 2% to approximately 20% by weight, carbon in a range from approximately 60% to approximately 70% by weight, with the balance of the composite layer 44 principally being a mixture of metal oxides and metal sulfides of TABLE 2 and other materials as described in TABLE 1.

Figure 5:
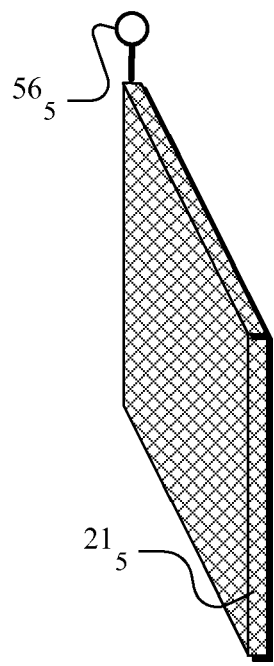
FIG. 5 depicts an electroactive material having nanoparticles and having a terminal electrically coupled to the particles for charge transport.

FIG. 5 depicts an electroactive material $21_5$ having nanoparticles and having a terminal $56_5$ electrically coupled to the particles for charge transport. The terminal $56_5$ functions as an electrode for allowing charge transport to and from the particles forming the nanomaterial $21_5$.

Figure 6:
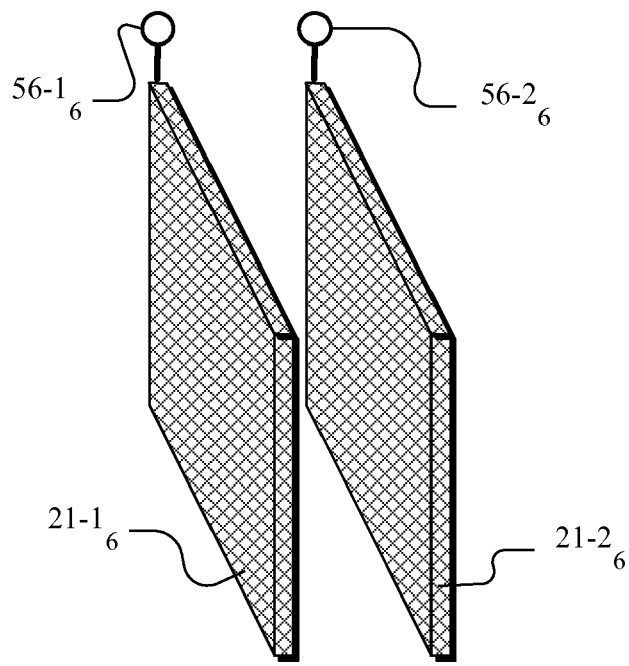
FIG. 6 depicts a device including first and second electroactive materials of the FIG. 5 type, each having nanoparticles and having a terminal electrically coupled to the particles for charge transport.

FIG. 6 depicts a device including first and second electroactive materials $21-1_6$ and $21-2_6$ of the FIG. 5 type, each having nanoparticles and having terminals $56-1_6$ and $56-2_6$ electrically coupled to the particles of the first and second electroactive materials $21-1_6$ and $21-2_6$, respectively, for charge transport.

Figure 7:
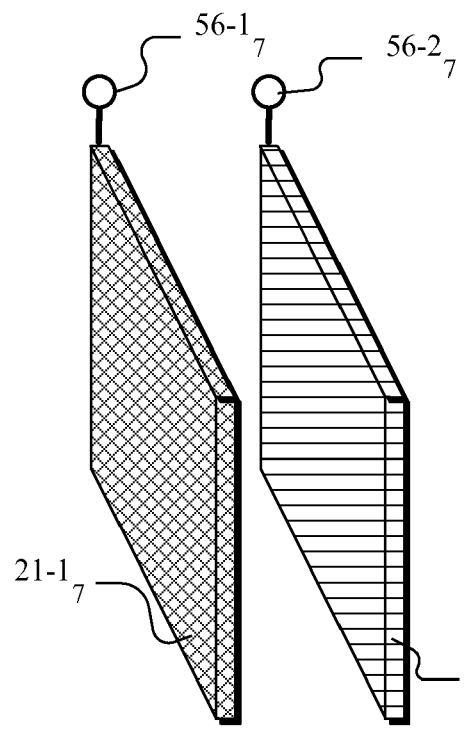
FIG. 7 depicts a device including a first electroactive material of the FIG. 5 type and including a second electroactive material, different from the first electroactive material, having nanoparticles and having a terminal electrically coupled to the particles for charge transport.

FIG. 7 depicts a device including a first electroactive material electroactive material $21-1_7$ of the FIG. 5 type and having terminals $56-1_7$ and including a second electroactive material $21-2_7$, different from the first electroactive material, having nanoparticles and having a terminal $56-2_7$ electrically coupled to the particles for charge transport.

Figure 8:
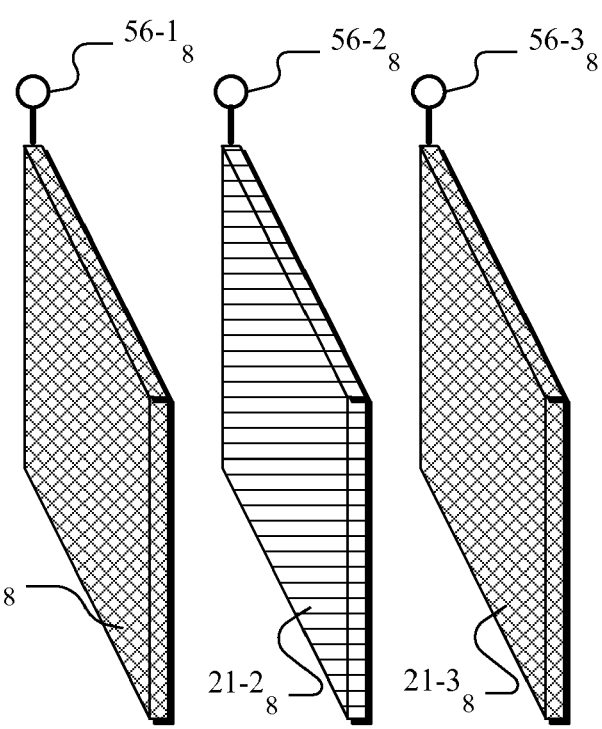
FIG. 8 depicts a device including first and second electroactive materials of the FIG. 7 type and including a third electroactive material, like the first electroactive material and having nanoparticles and having a terminal electrically coupled to the particles for charge transport.

FIG. 8 depicts a device a device including first and second electroactive materials $21-1_8$ and $21-2_8$ of the FIG. 5 type, each having nanoparticles and having terminals $56-1_8$ and $56-2_8$ electrically coupled to the particles of the first and second electroactive materials $21-1_8$ and $21-2_8$, respectively, for charge transport and including a third electroactive material $21-3_8$, like the first electroactive material and having nanoparticles and having a terminal $56-3_8$ electrically coupled to the particles for charge transport.

Figure 9:
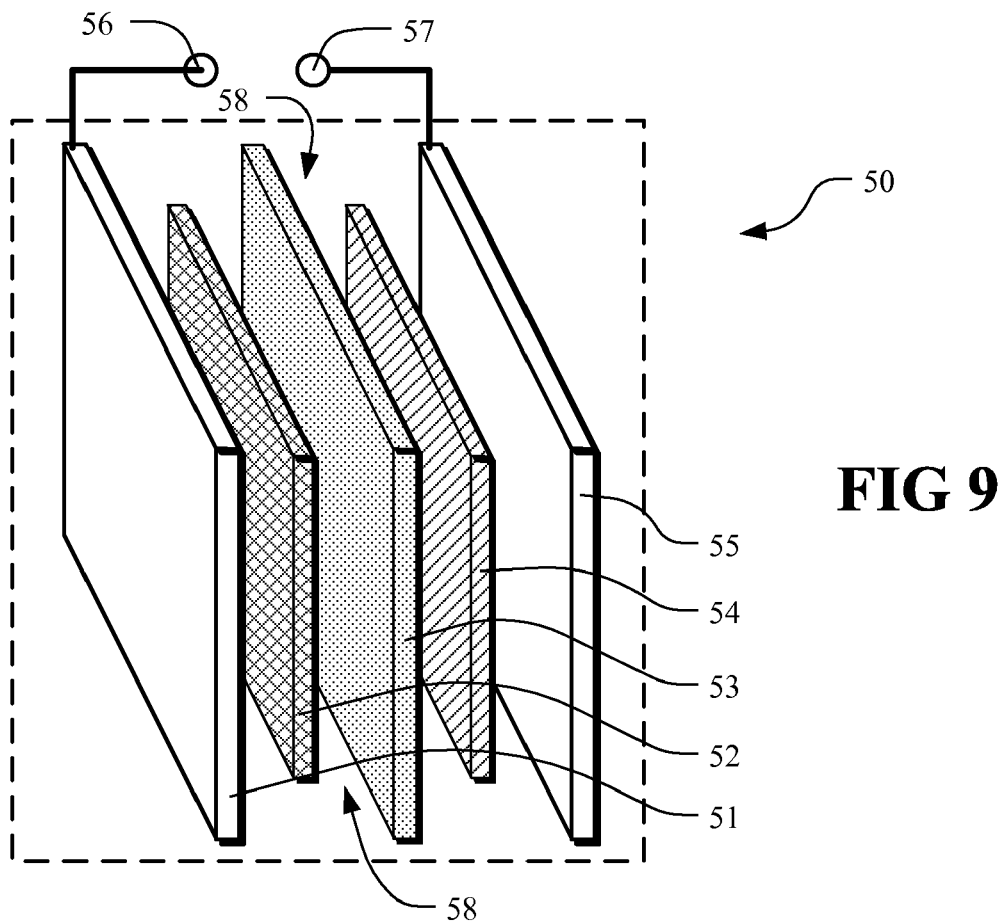
FIG. 9 depicts a schematic expanded representation of a battery having one electrode formed of particles including composites having zinc sulfide nanoclusters (anode) and another electrode formed of particles including composites having zinc-depleted nanoclusters (cathode).

In FIG. 9, a schematic representation of a battery 50 is shown having one electrode (anode) 52 and another electrode (cathode) 54. The anode 52 is formed of particles 21 as described in connection with FIG. 1, FIG. 2 and FIG. 3 and includes cluster 30 and specifically cluster 30-1 having zinc sulfide nanoclusters 32. The cathode 54 is formed of particles 21 as described in connection with FIG. 1, FIG. 2 and FIG. 4 and includes cluster 30 and specifically cluster 30-2 having zinc-depleted nanoclusters 42.

In FIG. 9, the electrode (anode) 52 and electrode (cathode) 54 are immersed in a solution 58 which in one example is 38% potassium hydroxide, K(OH), in water. The potassium hydroxide provides a vehicle for the migration of zinc hydroxide, $Zn(OH)_2$, from the vicinity of the anode 52 to the vicinity cathode 54. A separator 53 is provided between the anode 52 and the cathode 54. The separator 53 is a membrane which permits the migration of zinc hydroxide through the membrane while preventing any carbon transfer or contact between the anode 52 and the cathode 54. The anode 52 contacts a metal or other good-conducting terminal connector 51 to enable electron flow at contact 56. The cathode 54 contacts a metal or other good-conducting material 55 to enable electron flow at terminal 57. The battery elements 51, 52, 53, 54 and 55 are schematically shown with exaggerated spacing for clarity in the description and ease of viewing the drawing.

The electrochemical reaction of the battery 50 produces an open circuit voltage between the terminals 56 and 57. While 0.9 volt is the electrochemically predicted open circuit voltage, it has been found that the open circuit voltage is in a range from approximately 1.2 volts to approximately 1.3 volts.

In FIG. 9, the voltage generated results from the electrochemical reactions at the anode 52 and the cathode 54 under the condition that zinc hydroxide, $Zn(OH)_2$, is the charge transport from the vicinity of anode 52 through the membrane to the vicinity of cathode 54.

In the battery 50 of FIG. 9, the anode 52 reaction can be as follows:

$$Zn^{2+}+4OH^{1-}\rightarrow Zn(OH)_4^{2-}+2e^{1-}(-1.25\ volt)$$

In the battery 50 of FIG. 9, the cathode reaction is as follows:

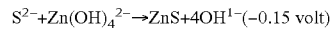

$$S^{2-}+Zn(OH)_4^{2-}\rightarrow ZnS+4OH^{1-}(-0.15\ volt)$$

In the battery 50 of FIG. 9, the combined reaction is as follows:

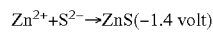

$$Zn^{2+}+S^{2-}\rightarrow ZnS(-1.4\ volt)$$

Figure 10:
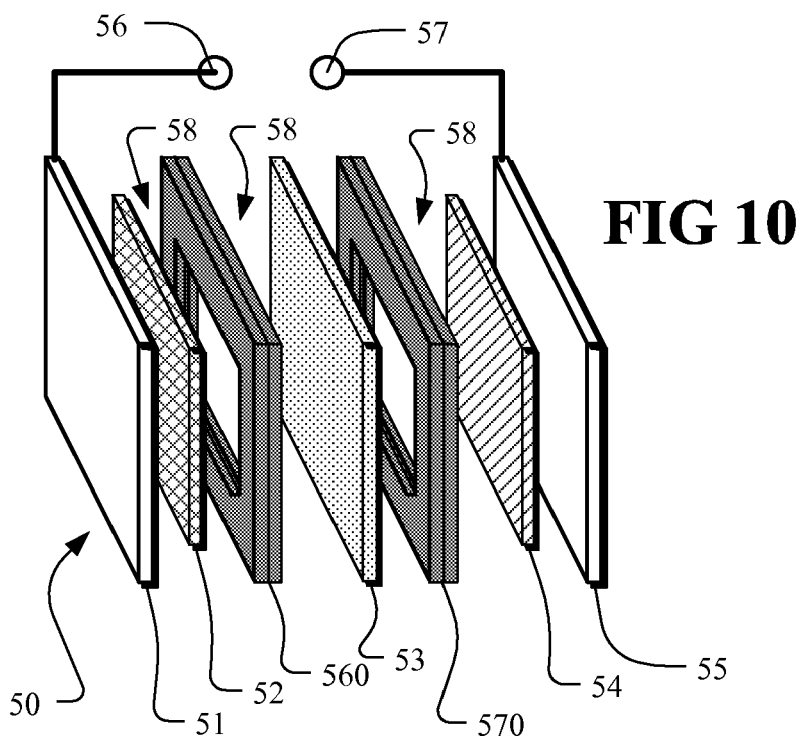
FIG. 10 depicts a schematic expanded representation of a battery of the FIG. 9 type having added spacers

In FIG. 10, a schematic representation of battery 50 of FIG. 9 is shown having the addition of spacers 560 and 570. The spacer 560 is between the anode 52 and the membrane separator 53. The spacer 570 is between the cathode 54 and the membrane separator 53. The spacers 560 and 570 help establish the thickness of the battery 50 and also provide hermetic seals that constrain the electrolyte 58. The battery elements 51, 52, 53, 54, 55, 560 and 570 are schematically shown with exaggerated spacing for clarity in the description and ease of viewing the drawing.

Figure 11:
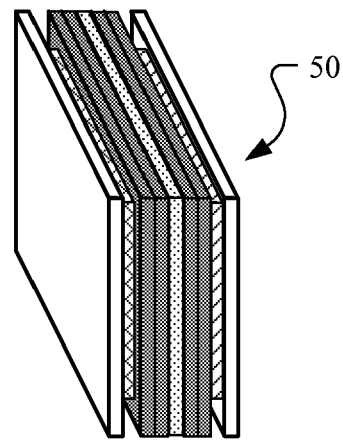
FIG. 11 depicts a schematic collapsed representation of the battery of the FIG. 10.

In FIG. 11, a schematic representation of battery 50 of FIG. 6 is shown without expanded spacing.

Figure 12:
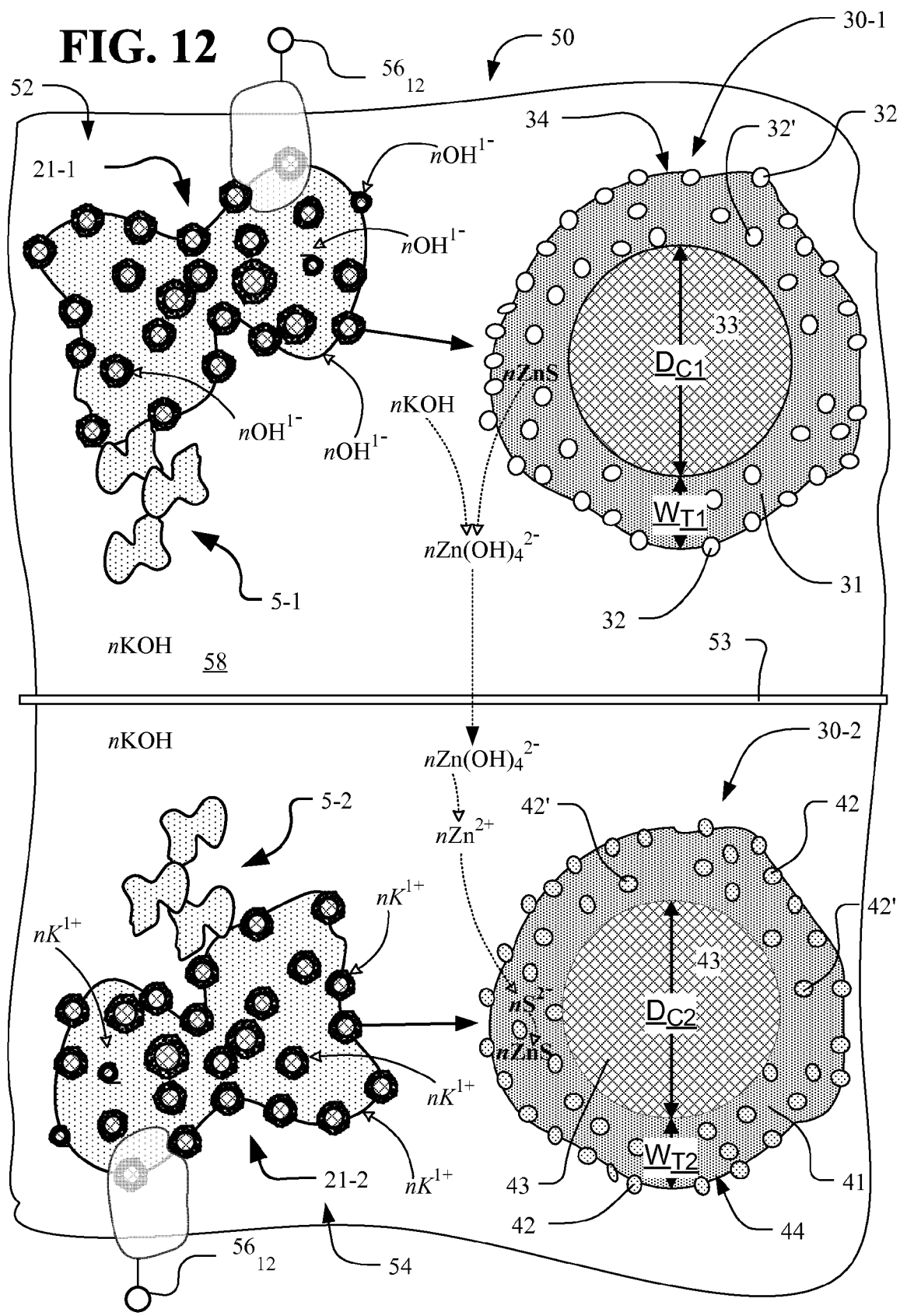
FIG. 12 depicts a representation of an anode and cathode formed of electroactive materials.

In FIG. 12, the battery 50 shown in FIG. 9, FIG. 10 and FIG. 11 is shown with greater details of the nanoscale structure of the materials and of the charge transport.

In FIG. 12, the battery 50 includes a first electroactive electrode 52 including a material 5-1 formed of plurality of particles 21-1. Each includes a plurality of clusters, of which cluster 30-1 is typical. Each cluster includes a carbon nanosphere core 33, a composite layer 34 surrounding and bound to the carbon nanosphere core 33. The composite layer 34 includes redox-active zinc sulfide nanoclusters 32 embedded in the composite layer 34, and a binding composite 31 binding the plurality of nanoclusters 32. A first terminal $56_{12-1}$ electrically couples to the first plurality of particles 21-1 for charge transport.

A second electroactive electrode electroactive electrode 54 including a material 5-2 formed of plurality of particles 21-2. Each includes a plurality of clusters, of which cluster 30-2 is typical. Each cluster includes a carbon nanosphere core 43, a composite layer 44 surrounding and bound to the nanosphere core 43. The composite layer 44 includes zinc-depleted sulfide nanoclusters 42 embedded in the composite layer 44, and a binding composite 41 binding the plurality of nanoclusters 42. A second terminal $56_{12\text{-}2}$ electrically couples to the first plurality of particles 21-2 for charge transport.

A separator 53 is provided between the first electrode 52 and the second electrode 54. An electrolyte 58 contacts the first electrode 52 and the second electrode 54 for transporting electrical charges between the first electrode 52 and the second electrode 54 using zinc-based ions.

In general in FIG. 12, the electroactive electrodes 52 and 54 undergo reactions that take place in an electrolyte solution 58, for example KOH, at the interfaces of the electroactive electrodes 52 and 54 using zinc-based ions. Electrons transfer between the electroactive electrodes 52 and 54 and the electrolyte solution 58 or dissociated species of the electrolyte, $nK^{1+}$, $nOH^{1-}$ and $nZn(OH)_4^{2-}$.

When terminals $56_{12\text{-}1}$ and $56_{12\text{-}2}$ are connected to an external circuit (not shown), the electrolyte solution 58 reacts with the material 5-1 and particularly the particles 21-1, clusters 30-1. For each cluster 30-1, the electrolyte solution 58 reacts with the nanoclusters 32 and couples directly with the composite layer 34, the nanocluster binder 31 and the carbon nanosphere core 33. The electrolyte is in one example potassium hydroxide, KOH.

The process of electron production involves the species $nOH^{1-}$ from solution contacting a cluster such as cluster 30-1. For each cluster the species $nOH^{1-}$ reacts with nanoclusters 32, with nanocluster binder 31 and with the carbon nanosphere core 33 to form the ionic species $nZn(OH)_4^{2-}$. The reaction of the species $nOH^{1-}$ is efficient when the electrolyte solution 58 is in contact with the surface located nanoclusters clusters 32 and nanocluster binder 31 and hence where the diffusion path of the species $nOH^{1-}$ is short, typically 10 nanometers or less. Because the diffusion path of the species $nOH^{1-}$ is short, the diffusion rate is fast.

Additionally, the internal nanoclusters 32', the internal nanocluster binder 31 and the carbon nanosphere core 33 are efficiently coupled for electron production by reaction with the species $nOH^{1-}$ through intercalation and close proximity of the internal nanoclusters 32', the internal nanocluster binder 31 and the carbon nanosphere core 33. Again, the intercalation distance is short, typically 80 nanometers or less and hence the intercalation rate is fast.

At the anode, the species, the species $nOH^{1-}$ has interacted with ZnS to produce the zinc-based ion $nZn(OH)_4^{2-}$ which is transported across the membrane 53 to the region of the electroactive electrode 54.

The process of electron recombination involves the zinc-based ion $nZn(OH)_4^{2-}$ from solution contacting a cluster such as cluster 30-2. For each cluster 30-2, the ion $nZn(OH)_4^{2-}$ reacts with nanoclusters 42, zinc-depleted zinc sulfide clusters $nS^{2-}$, and with nanocluster binder 41 and with the nanocluster core 43 to form the zinc sulfide, ZnS. The reaction of the ion $nZn(OH)_4^{2-}$ is efficient when the electrolyte solution 58 is in contact with the surface located nanoclusters clusters 42, zinc-depleted zinc sulfide clusters $nS^{2-}$, and nanocluster binder 41. Because the diffusion path of the species the ion $nZn(OH)_4^{2-}$ is short, typically 10 nanometers or less, the diffusion rate is fast.

For recharging operation, the process is the reverse of electron production. The recharging operation involves the species $nOH^{1-}$ from solution contacting a cluster such as cluster 30-2. For each cluster the species $nOH^{1-}$ reacts with nanoclusters 42, with nanocluster binder 41 and with the nanocluster core 43 to form the ionic species $nZn(OH)_4^{2-}$. The reaction of the species $nOH^{1-}$ is efficient when the electrolyte solution 58 is in contact with the surface located nanoclusters clusters 42 and nanocluster binder 41 and hence where the diffusion path of the species $nOH^{1-}$ is short, typically 10 nanometers or less. Because the diffusion path of the species $nOH^{1-}$ is short, the diffusion rate is fast.

Additionally, the internal nanoclusters 42', the internal nanocluster binder 41 and the nanocore 43 are efficiently coupled for electron production by reaction with the species $nOH^{1-}$ through intercalation and close proximity of the internal nanoclusters 42', the internal nanocluster binder 41 and the nanocore 43. Again, the intercalation distance is short, typically 80 nanometers or less and hence the intercalation rate is fast.

At the cathode, the species, the species $nOH^{1-}$ has interacted with ZnS to produce the zinc-based ion $nZn(OH)_4^{2-}$ which is transported back across the membrane 53 to the region of the electroactive electrode 52.

The process of electron recombination involves the zinc-based ion $nZn(OH)_4^{2-}$ from solution contacting a cluster such as cluster 30-1. For each cluster 30-1, the ion $nZn(OH)_4^{2-}$ reacts with nanoclusters 32, zinc-depleted zinc sulfide clusters $nS^{2-}$, and with nanocluster binder 31 and with the carbon nanosphere core 33 to form the zinc sulfide, ZnS. The reaction of the ion $nZn(OH)_4^{2-}$ is efficient when the electrolyte solution 58 is in contact with the surface located nanoclusters clusters 32, zinc-depleted zinc sulfide clusters $nS^{2-}$, and nanocluster binder 31. Because the diffusion path of the species the ion $nZn(OH)_4^{2-}$ is short, typically 10 nanometers or less, the diffusion rate is fast.

The nanomaterial 5 is formed of a plurality of nanocomponents including nanoparticles 21, in turn formed of conductive carbon-based clusters 30 bound together by a conductive carbon-based cluster binder 22 including zinc sulfide nanoclusters 32 and zinc-depleted nanoclusters 42 and nanocluster binders, all having high densities of mobile charge carriers (electrons, electronic acceptors, ionic species).

The nanomaterial 5, and each of the nanocomponents, plays a key role in the process of charge transport including supplying electrons (at the anode 52) and electron acceptor sites (at the cathode 54). The charge transport occurs by the electron travel through the highly conductive and relatively short path of the binders 22, 31 and 41 with proximity to the nanoclusters 32 and 42. The small sizes of the particles 21 provide large surface areas. In general, particle sizes of less than about 100 nanometers are preferred in order to have large surface areas which provide ready access of the electrolyte 58 to all the nanocomponents of the particles 21. The combination of the high density of available electrons in all the nanocomponents of the particles 21 with the short distances among all the nanocomponents of the particles 21 and the large surface areas of the nanocomponents greatly enhances the energy and power densities achieved.

Because of the short nanodistances of the particles of the present invention, the density of clusters producing electrons tends to be high resulting in high energy densities greater than 150 watt-hours/kilogram. Because of the short nanodistances of the particles of the present invention, the intercalation rate is fast resulting in high power densities, for example, greater than 4000 watts/kilogram.

This efficiency of the production of electrons with the nanostructure elements of the present invention is distinguished from the inefficiency in conventional batteries where the electrodes are formed with materials having larger-sized particles and where the intercalation distance is long, typically 800 nanometers or more and the intercalation rate is slow.

The electron transfer can occur at an electrode through the release of chemical energy to create an internal voltage or through the application of an external voltage. Such electrochemical reactions where electrons are transferred between atoms or molecules are called oxidation/reduction or redox reactions. Oxidation and reduction reactions can be separated in space and time and devices with such reactions are often connected to external electric circuits. The creation of internal voltages at electrodes is useful in batteries and the application of external voltages to electrodes is useful in capacitors. In connection with electrochemical reactions at electrodes, the atom or molecule which loses electrons is oxidized, and the material which accepts the electrons is reduced.

In battery cells, electric current is generated from energy released by a spontaneous redox reaction. The battery cells have two electrodes (the anode and the cathode). The anode is the electrode where oxidation occurs and the cathode is the electrode where reduction occurs.

The electrodes of a battery cell are in an electrolyte where the cations are the oxidized form of the electrode metal. The tendency of the electrode metals to oxidize or reduce, in a particular electrolyte, is controlled by the electrochemical potential which depends on the temperature, pressure, the composition and concentration of the electrolyte and the nature and composition of the anode and the cathode. In a battery cell, when the anode undergoes oxidation and the cathode undergoes reduction, the sum (sign and magnitude) of the electrochemical potentials at both electrodes produces an electrical potential difference between the two electrodes.

Figure 13:
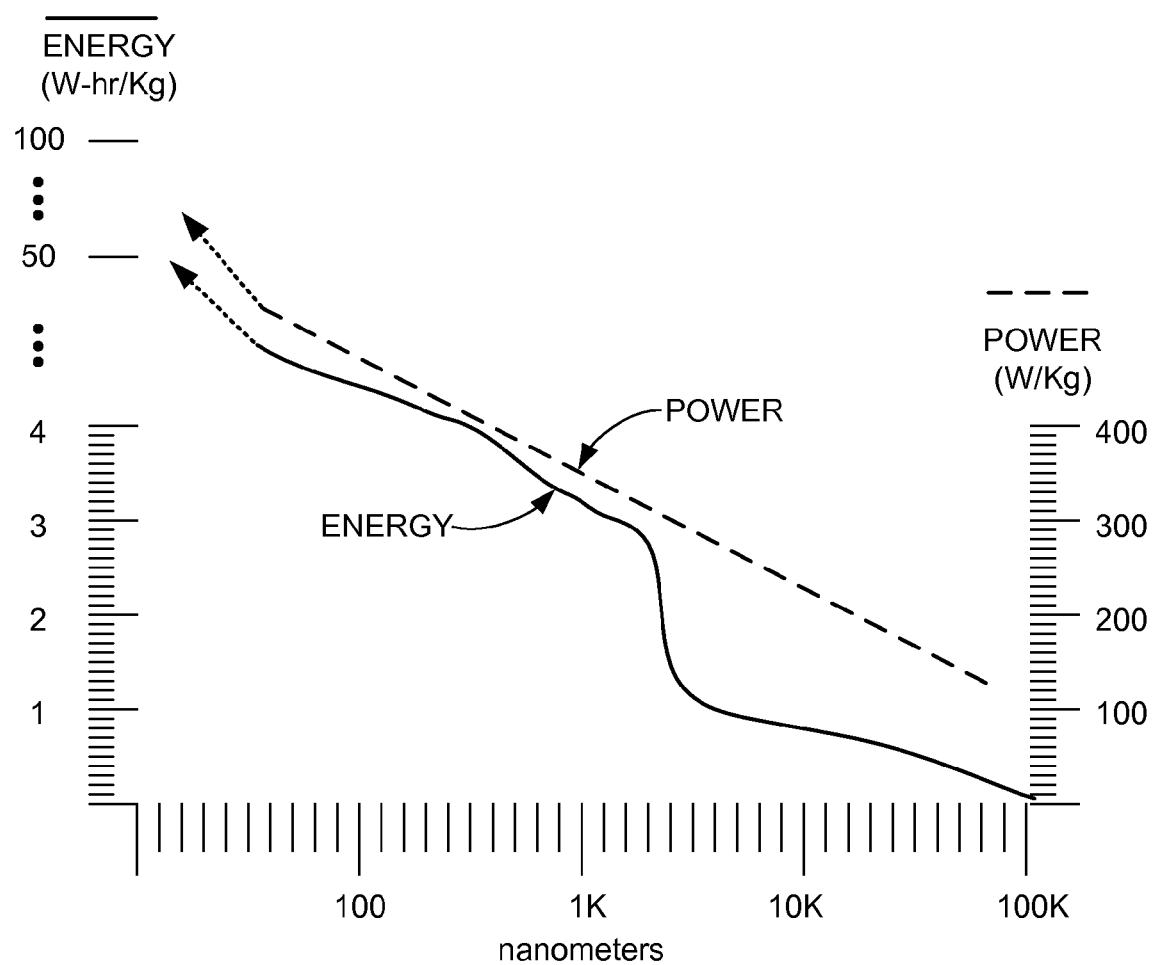
FIG. 13 depicts a graph depicting energy and power versus particle size for batteries with zinc nanocluster electrodes.

FIG. 13 depicts a graph depicting energy and power versus particle size for batteries with zinc nanocluster electrodes.

Figure 14:
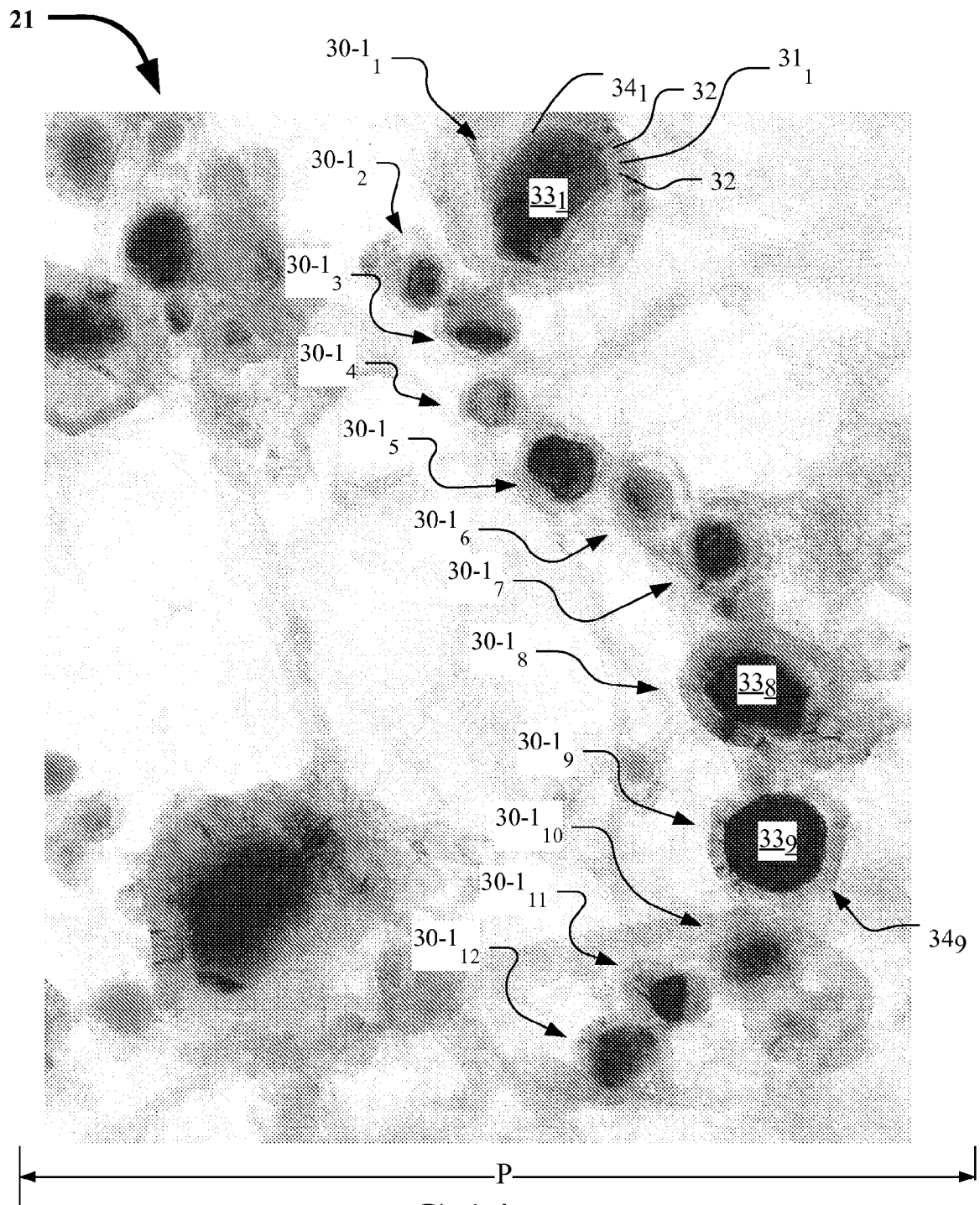
FIG. 14 depicts an electron-microscope scan of a particle including composites having zinc sulfide nanoclusters.

FIG. 14 depicts an electron-microscope scan of a particle 21 including composites having zinc sulfide nanoclusters. The particle 21 has a dimension P that is typically less than 100 nanometers, approximately $1 \times 10^{-7}$ meters. The electron-microscope scan of FIG. 14 was produced with 60,000× magnification using a Transmission Electron Microscope with a scan time of approximately one minute. A slide was prepared by dissolving 1 milligram of material into 20 milliliters of methanol in a scintillation vial, sonicating for 5 minutes and placing a 70 micro liter aliquot drop onto a TEM copper grid for imaging. The grid is then covered and placed in an environmental chamber to evaporate the methanol. The example of FIG. 14 is typical of many samples.

In FIG. 14, a plurality of zinc-sulfide clusters 30-1 are shown, including among others clusters $30-1_1$, $30-1_2$, $30-1_3$, $30-1_4$, ..., $30-1_{12}$. By way of example, the cluster $30-1_1$ includes a carbon nanosphere core 33, surrounded by a composite layer 34, having a large number of nanoclusters 32 (only two of which are labeled but includes many more as a function of the zinc sulfide packing density) held together by a nanocluster binder 311. Each of the others clusters $30-1_1$, $30-1_2$, $30-1_3$, $30-1_4$, ..., $30-1_{12}$ has similar structures.

In FIG. 14, the plurality of zinc-sulfide nanoclusters $30-1_1$, $30-1_2$, $30-1_3$, $30-1_4$, $30-1_{12}$ are arrayed in a structure that couples the nanoclusters 30-1 for energy transfer (electrical, thermal, photon, mechanical and other). It is evident in FIG. 14 that nanoclusters $30-1_1$, $30-1_2$, $30-1_3$, $30-1_4$, ..., $30-1_{12}$ are linked together to form a serial chain whereby the composite layer 34 of one cluster are in close proximity to the composite layer 34 of one or more adjacent nanoclusters. With such close proximity of composite layers 34, energy transfer is readily facilitated from adjacent to adjacent nanoclusters. It is highly desirable to have linking of nanostructures to provide the enhanced performance that derives from efficient electrical coupling and charge transport. The linking is achieved by close proximity binding of the clusters with conductive composite binders. The linking is further enhanced by the structure of the nanoclusters based upon carbon nanocores encased in a conductive carbon-based nanocluster binder. This linking is achieved as a result of the control of char formation in tire pyrolysis. This linking in the present invention is superior to nanotube technology where the linking is not in-situ provided, but must be added at great expense and with high difficulty.

FIG. 14 is a planar view of a thin plane of nanomaterial representing a monolayer of material, but it should be noted that the close proximity of the composite layers 34 occurs in three dimensions of a volume of material.

The close proximity of composite layers 34 and the resultant high energy transfer characteristics of the nanomaterials are determined as a function of the processing times, temperatures and pressures during pyrolysis of tires.

Figure 15:
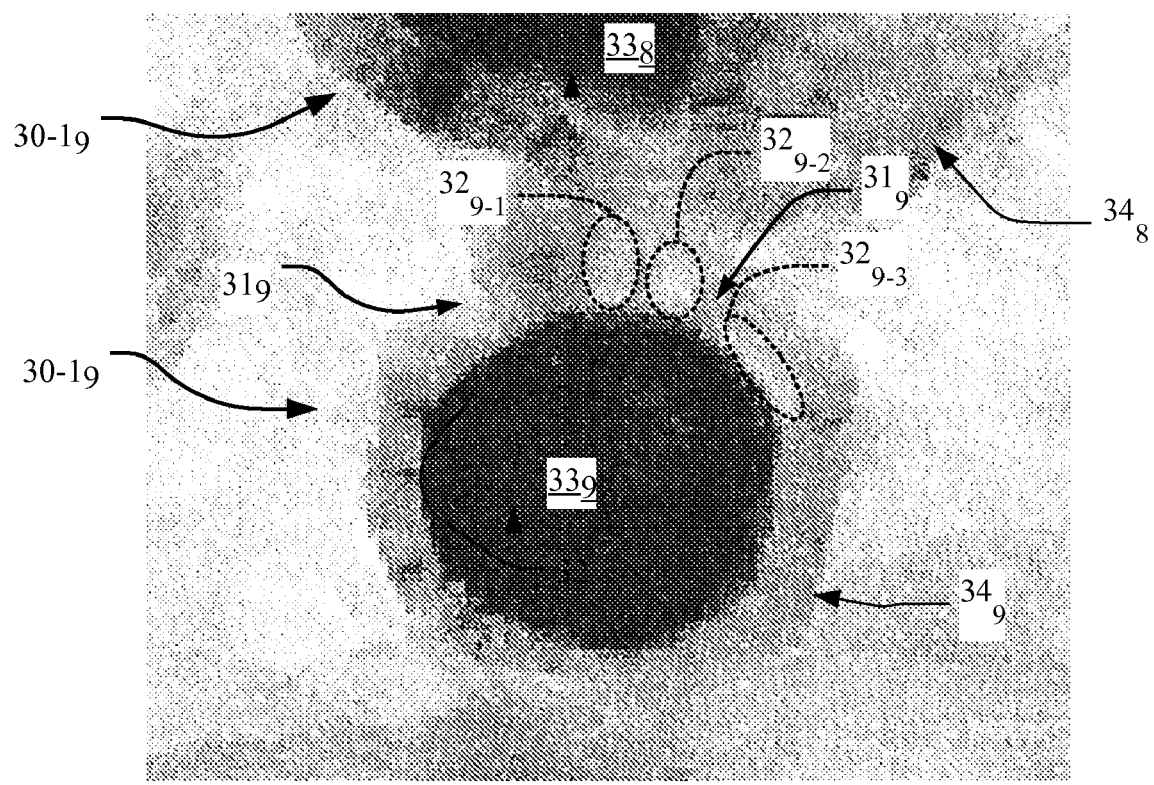
FIG. 15 depicts an electron-microscope scan of one of the nanoclusters of FIG. 14.

FIG. 15 depicts an enlarged view of a portion of the electron-microscope scan of the cluster $30-1_9$ adjacent to and in close proximity to the cluster $30-1_8$ of FIG. 14. The composite layers $34_8$ and $34_9$ of clusters $30-1_8$ and $30-1_9$ are in close proximity. The cluster $30-1_9$ includes, by way of example, nanoclusters $32_{9-1}$, $32_{9-2}$ and $32_{9-3}$. The nanoclusters $32_{9-1}$, $32_{9-2}$ and $32_{9-3}$ are bound together in the composite layer $34_9$ by the nanocluster binder $31_9$. The zinc sulfide properties of the nanoclusters $32_{9-1}$, $32_{9-2}$ and $32_{9-3}$ are identified by in-situ x-ray backscattering images observed during the scan. Other materials present (not shown in FIG. 15) include many of the materials of TABLE 2 in varying that are concentrations are generally less than the concentration of zinc sulfide. The concentration of pyrolitic carbon is typically greater than the concentration of zinc sulfide. The zinc from the zinc sulfide in the nanoclusters $32_{9-1}$, $32_{9-2}$ and $32_{9-3}$ is used in forming the ion responsible for charge transport. The pyrolitic carbon in the composite 34 facilitates the ion formation and charge transport. The other materials of TABLE 2 may also play a contributing role to the operation.

Figure 16:
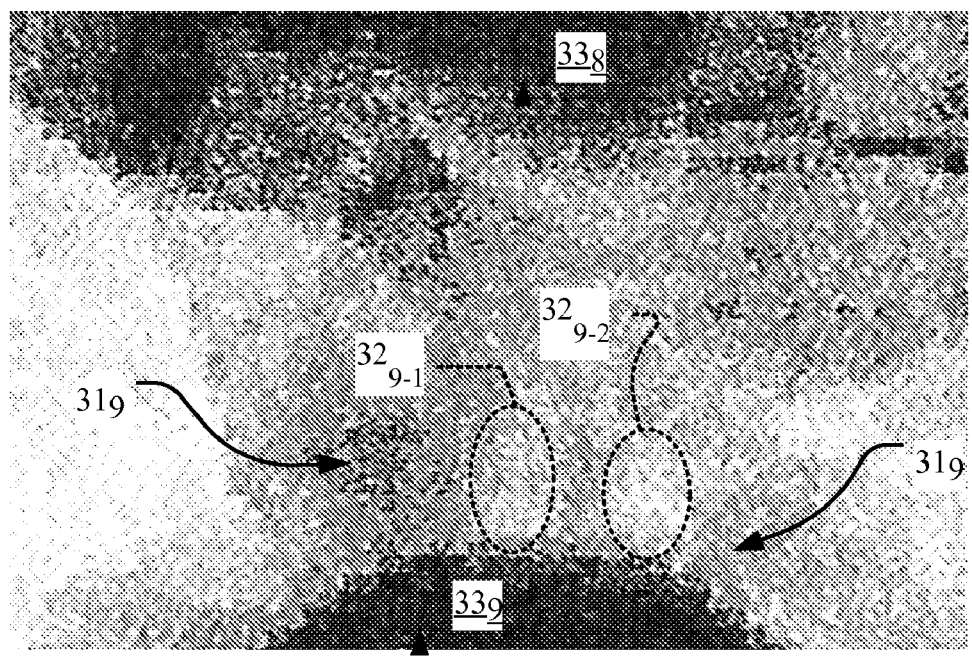
FIG. 16 depicts an electron-microscope scan showing further details of the nanocluster of FIG. 15.

FIG. 16 depicts an electron-microscope scan showing further details of the nanocluster of FIG. 15.

Figure 17:
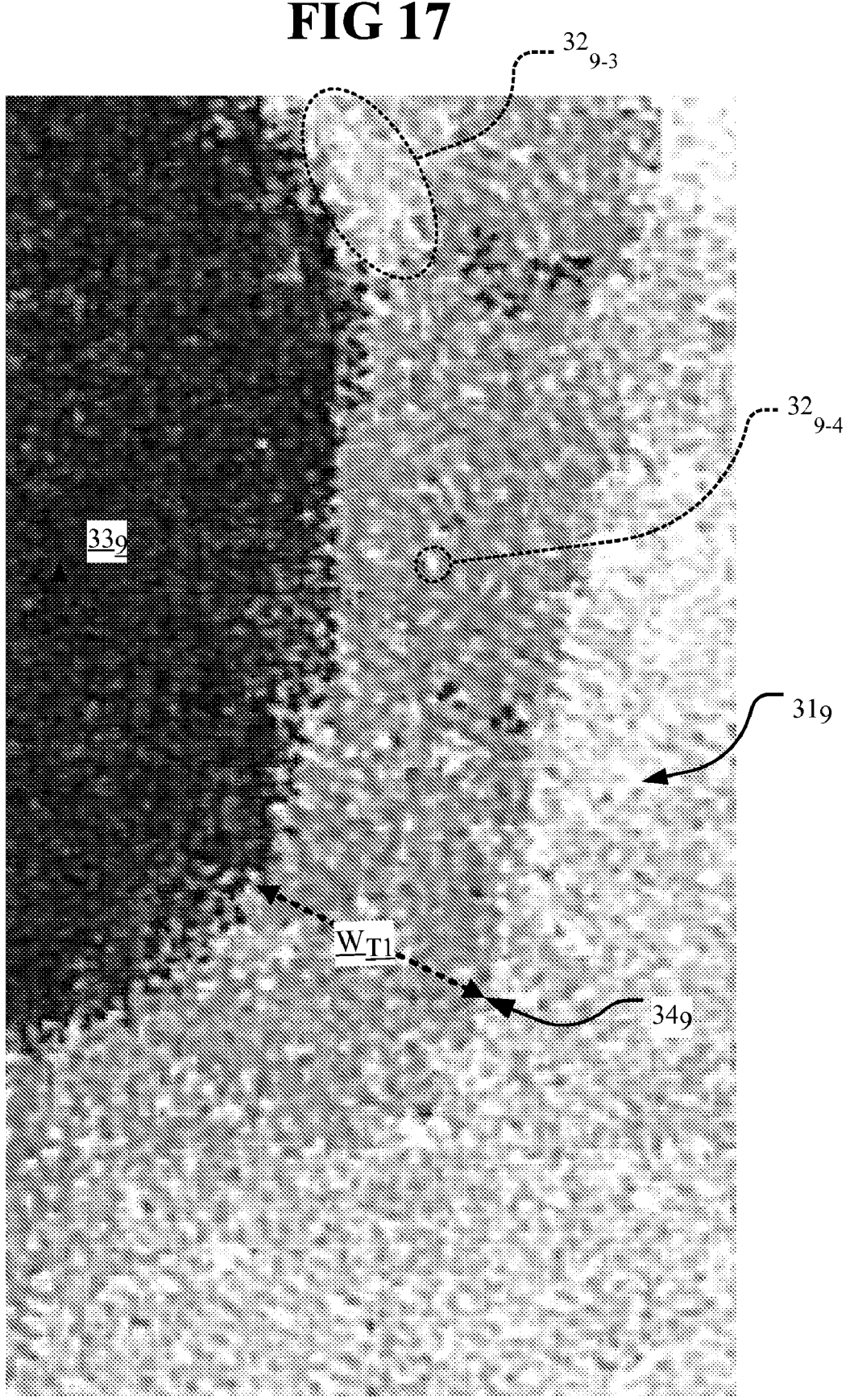
FIG. 17 depicts an electron-microscope scan showing even further details of the nanocluster of FIG. 16.

FIG. 17 depicts an electron-microscope scan showing even further details of the nanocluster of FIG. 16. The nanocluster $32_{9-3}$ is much larger than the nanocluster $32_{9-4}$ and demonstrates that the zinc sulfide nanocluster have widely varying size distributions.

Figure 18:
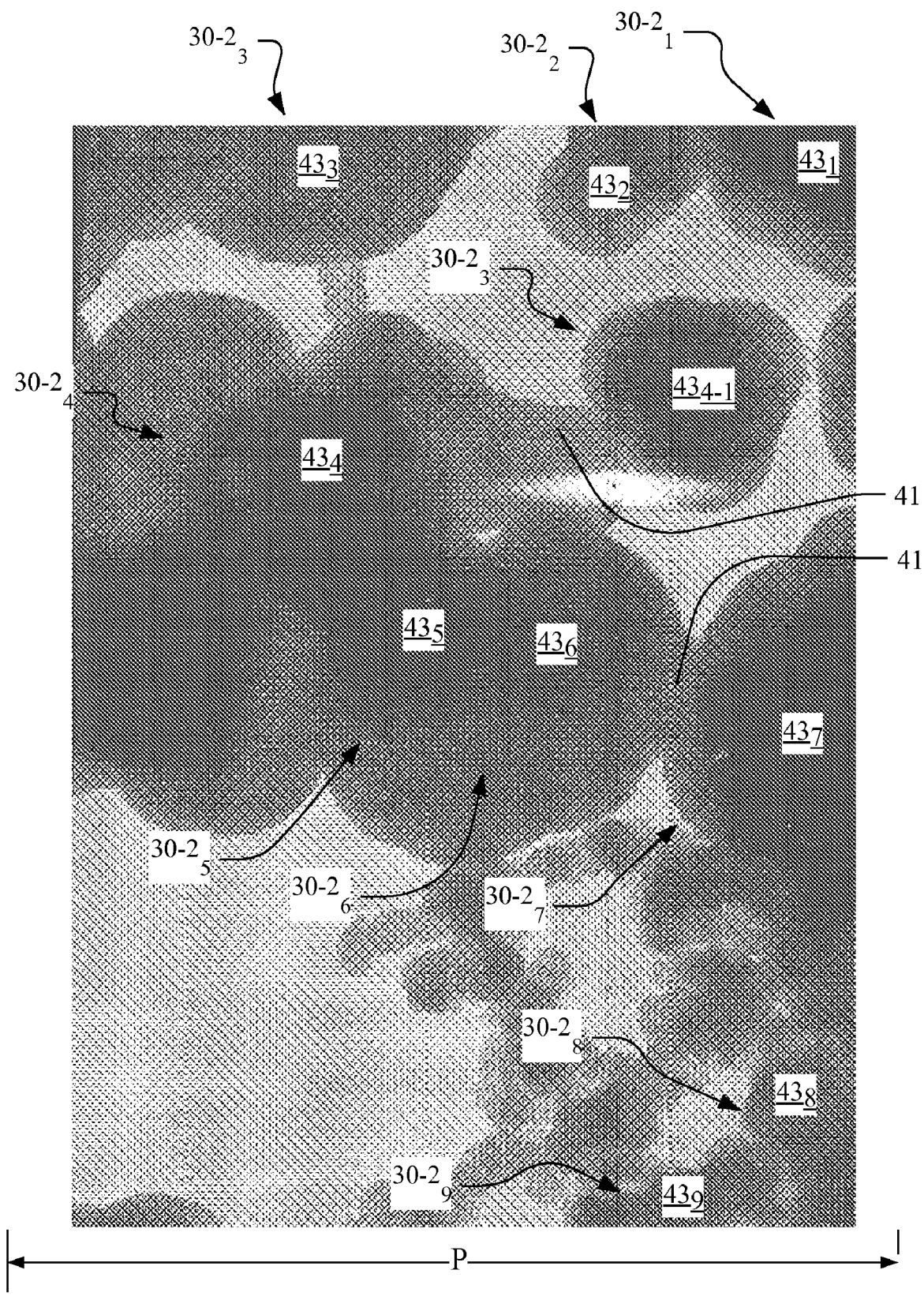
FIG. 18 depicts an electron-microscope scan of a particle including composites having zinc-depleted nanoclusters.

FIG. 18 depicts an electron-microscope scan of a particle including composites having zinc-depleted nanoclusters clusters $30-2_1$, $30-2_2$, $30-2_3$, $30-2_4$, ..., $30-2_9$. Each of the nanoclusters clusters $30-2_1$, $30-2_2$, $30-2_3$, $30-2_4$, ..., $30-2_9$ includes a graphitic core 43 including the graphitic cores $43_1$, $43_2$, $43_3$, $43_4$, ..., $43_9$ surrounded by composite layers 44. In the material of FIG. 18, the zinc sulfide has been removed through processing the pyrolitic char. In one example, the char is mixed with a solution of 38% by weight KOH and two percent by weight lithium chloride and mixed to form a paste. The paste is divided into two parts and placed into an electrolytic cell, one part on the anode and the other part on the cathode with a membrane between. The cell is driven by 1.6 volts (600 milliamps for a duration of 14 hours. Thereafter, a portion of the paste from the anode (1 milligram) is washed in de-ionized water followed by filtration and addition to 20 milliliters of methanol in a scintillation vial and sonicated for 5 minutes and placing a 70 micro liter aliquot drop onto a TEM copper grid for imaging. The grid is then covered and placed in an environmental chamber to evaporate the methanol. The example of FIG. 18 is typical of many samples. Materials of the FIG. 18 type compared with materials of the FIG. 14 type exhibited surface charging indicative of static build up on the surface.

In the plurality of zinc-depleted nanoclusters $30-2_1$, $30-2_2$, $30-2_3$, $30-2_4$, ..., $30-2_9$ are arrayed in a structure that couples the nanoclusters 30-2 for energy transfer (electrical, thermal, photon, mechanical and other). It is evident in FIG. 18 that nanoclusters $30-2_1$, $30-2_2$, $30-2_3$, $30-2_4$, ..., $30-2_9$ tend to form a chain whereby the composite layers 44 of one cluster are in close proximity to the composite layer 44 of one or more adjacent nanoclusters. With such close proximity of composite layers 44, energy transfer is facilitated from adjacent to adjacent nanoclusters. FIG. 18 is a planar view of a thin plane of nanomaterial representing a monolayer of material, but it should be noted that the close proximity of the composite layers 44 occurs in three dimensions of a volume of material.

In FIG. 18, the nanoclusters $30-2_1$, $30-2_2$, $30-2_3$, $30-2_4$, ..., $30-2_9$ are bound together in the composite layers 44 by the nanocluster binders 41. The zinc-depleted sulfide properties of the nanoclusters $30-2_1$, $30-2_2$, $30-2_3$, $30-2_4$, ..., $30-2_9$ are identified by in-situ x-ray backscattering images observed during the scan. Other materials present (not shown in FIG. 18) include many of the materials of TABLE 2 in varying concentrations. The concentration of pyrolitic carbon is typically greater than the concentration of zinc-depleted sulfide. The pyrolitic carbon in the composite 34 facilitates the ion formation and charge transport. The other materials of TABLE 2 may also play a contributing role to the operation.

Figure 19:
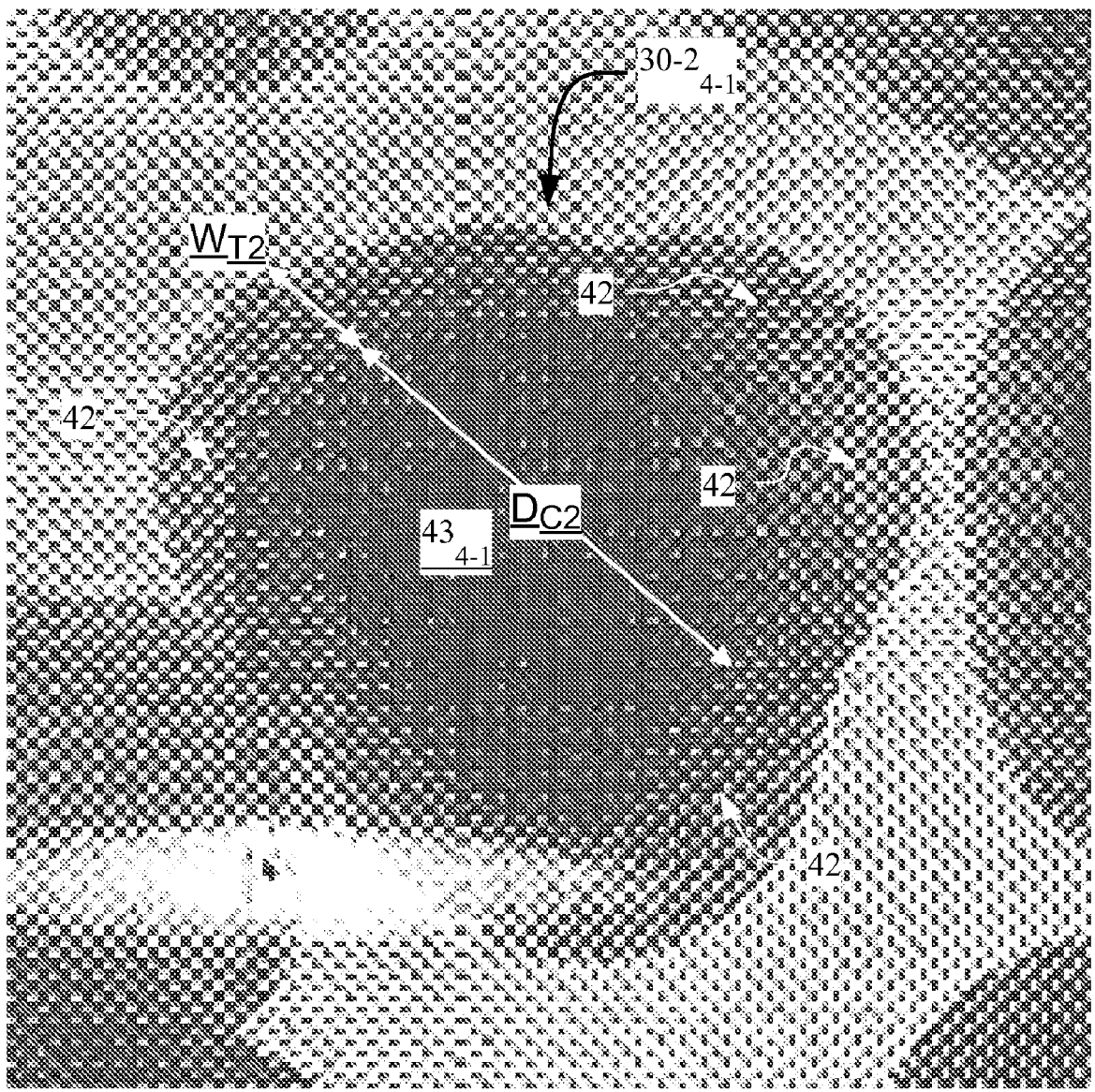
FIG. 19 depicts an electron-microscope scan of one of the nanoclusters of FIG. 18.

FIG. 19 depicts an electron-microscope scan of the nanocluster $30-2_{4-1}$ of FIG. 18.

While the invention has been particularly shown and described with reference to preferred embodiments thereof it will be understood by those skilled in the art that various changes in form and details may be made therein without departing from the scope of the invention.

The invention claimed is:

1. A battery including an electroactive material for charge transport comprising,
   a first plurality of particles, each particle including,
      a plurality of clusters, each cluster including,
         a carbon nanosphere core,
         a composite layer surrounding and bound to the nanosphere core, the composite layer including redox-active zinc sulfide nanoclusters embedded in the composite layer, and
      a binding composite binding the plurality of clusters
   a first terminal electrically coupled to the first plurality of particles for charge transport.

2. The battery including the electroactive material of claim 1 further including,
   a second plurality of particles, each particle including,
      a plurality of clusters, each cluster including,
         a carbon nanosphere core,
         a composite layer surrounding and bound to the nanosphere core, the composite layer including nanoclusters embedded in the composite layer, and
      a binding composite binding the plurality of clusters,
   a second terminal electrically coupled to the second plurality of particles for charge transport.

3. The battery including the electroactive material of claim 2 wherein the second plurality of particles are substantially the same as the first plurality of particles including redox-active zinc sulfide nanoclusters.

4. The battery including the electroactive material of claim 2 wherein the second plurality of particles are substantially different from the first plurality of particles including zinc-depleted sulfide nanoclusters.

5. The battery including the electroactive material of claim 4 wherein the zinc-depleted sulfide nanoclusters are charge receptors and wherein charge transport uses electrolyte ions.

6. The battery including the electroactive material of claim 2 wherein the second plurality of particles are separated from the first plurality of particles by an ion permeable membrane.

7. The battery including the electroactive material of claim 2 wherein the carbon nanosphere core has a diameter of less than approximately 100 nanometers.

8. The battery including the electroactive material of claim 2 wherein the composite layer has a wall thickness of less than approximately 1200 nanometers.

9. The battery including the electroactive material of claim 2 wherein a substantial number of the clusters have a diameter of less than approximately 1200 nanometers.

10. The battery including the electroactive material of claim 1 further including,
    a second plurality of particles, each particle including,
       a plurality of clusters, each cluster including,
          a carbon nanosphere core,
          a composite layer surrounding and bound to the nanosphere core, the composite layer including nanoclusters embedded in the composite layer, and
       a binding composite binding the plurality of clusters,
    a second terminal electrically coupled to the second plurality of particles for charge transport,
    a third plurality of particles, each particle including,
       a plurality of clusters, each cluster including,
          a carbon nanosphere core,
          a composite layer surrounding and bound to the nanosphere core, the composite layer including nanoclusters embedded in the composite layer, and
       a binding composite binding the plurality of clusters,
    a third terminal electrically coupled to the second plurality of particles for charge transport.

11. A battery comprising,
    a first electroactive electrode including,
       a first plurality of particles, each particle including,
          a plurality of clusters, each cluster including,
             a carbon nanosphere core,
             a composite layer surrounding and bound to the nanosphere core, the composite layer including redox-active zinc sulfide nanoclusters embedded in the composite layer, and
          a binding composite binding the plurality of clusters,
       a first terminal electrically coupled to the first plurality of particles for charge transport,
    a second electroactive electrode including,
       a second plurality of particles, each particle including,
          a plurality of clusters, each cluster including,
             a carbon nanosphere core,
             a composite layer surrounding and bound to the nanosphere core, the composite layer including redox-active zinc-depleted sulfide nanoclusters embedded in the composite layer, and
          a binding composite binding the plurality of clusters,
       a second terminal electrically coupled to the second plurality of particles for charge transport,
    a separator between the first electrode and the second electrode,
    an electrolyte contacting the first and second electrodes for charge transport between the first and
       second electrodes using zinc-based ions.

12. The battery of claim 11 wherein the redox-active zinc sulfide nanoclusters operate to transport charges for discharging and operate to transport charges for recharging.

13. The battery of claim 11 wherein the composite layer is conductive to electrically couple the nanosphere core to the zinc sulfide nanoclusters to provide high energy density.

14. The battery of claim 11 wherein the first electroactive electrode and the second electroactive electrode are formed of tire char and wherein the composite layers for the first and second electroactive electrodes are conductive to electrically couple the nanosphere cores to the nanoclusters to provide high energy density.

15. The battery of claim 11 wherein the first electroactive electrode and the second electroactive electrode are formed of tire char and are heavy-metal free and wherein the composite layers for the first and second electroactive electrodes are conductive to electrically couple the nanosphere cores to the nanoclusters to provide high energy density.

16. The battery of claim 11 wherein the first electroactive electrode and the second electroactive electrode are formed of tire char and are heavy-metal free and wherein the composite layers for the first and second electroactive electrodes are conductive to electrically couple the nanosphere cores to the nanoclusters to provide high energy density and where the redox-active zinc sulfide nanoclusters operate to transport charges for discharging and operate to transport charges for recharging.

17. The battery of claim 11 wherein the first electroactive electrode and the second electroactive electrode are entirely tire char.

* * * * *